United States Patent [19]

Ohbo

[11] Patent Number: 4,941,052
[45] Date of Patent: Jul. 10, 1990

[54] IMAGE SIGNAL PROCESSOR WITH NOISE ELIMINATION CIRCUIT

[75] Inventor: Masahiro Ohbo, Tokyo, Japan
[73] Assignee: NEC Corporation, Tokyo, Japan
[21] Appl. No.: 310,620
[22] Filed: Feb. 15, 1989
[30] Foreign Application Priority Data
 Feb. 16, 1988 [JP] Japan ................................. 63-34518
[51] Int. Cl.$^5$ ........................ H04N 3/14; H04N 5/14
[52] U.S. Cl. ................................ 358/213.15; 358/167
[58] Field of Search ...................... 358/213.15, 213.16, 358/213.17, 213.18, 166, 167

[56] References Cited

U.S. PATENT DOCUMENTS 4,065,788 12/1977 Meier et al. ........................... 358/166
 4,413,284 11/1983 Izumita et al. .................. 358/213.15
 4,473,845 9/1984 Davy ..................................... 358/163

*Primary Examiner*—Jin F. Ng
*Assistant Examiner*—M. Shehata
*Attorney, Agent, or Firm*—Burns, Doane, Swecker & Mathis

[57] ABSTRACT

For improvement in high frequency response characteristics, a noise eliminating circuit incorporated in an image signal processor has a delay line coupled between an output node of a charge coupled device and a ground node, and an emitter follower circuit coupled at the base node thereof to the output node the the charge coupled device, and each electric image signal supplied from the charge coupled device is reflected from the ground node to introduce a delay therein and merged into the subsequent electric image signal to produce a noise eliminated electric image signal which is supplied to the emitter follower circuit, so that the noise eliminated electric image signal is amplified by the emitter follower circuit with a constant gain, because of a small time constant coupled to the base node of the emitter follower circuit.

6 Claims, 4 Drawing Sheets

PRIOR-ART

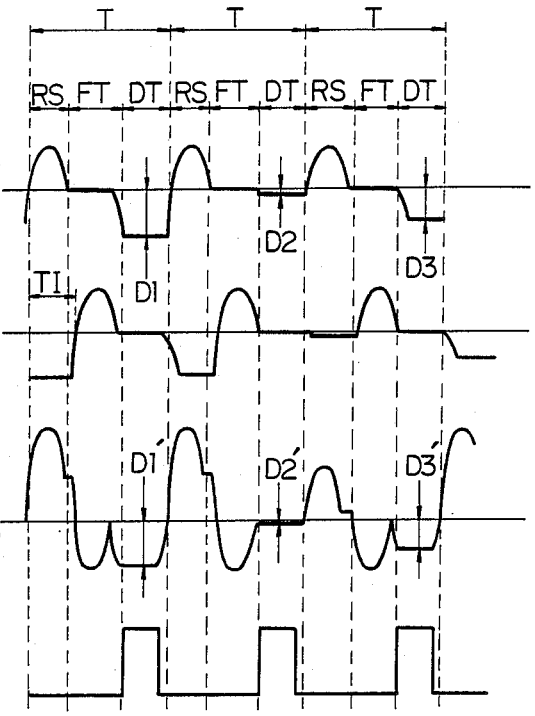
FIG. 2(a) PRIOR-ART
ELECTRIC IMAGE SIGNALS
FIG. 2(b) PRIOR-ART
DELAYED ELECTRIC IMAGE SIGNALS
FIG. 2(c) PRIOR-ART
NOISE ELIMINATED ELECTRIC IMAGE SIGNALS
FIG. 2(d) PRIOR-ART
TRANSFER SIGNAL
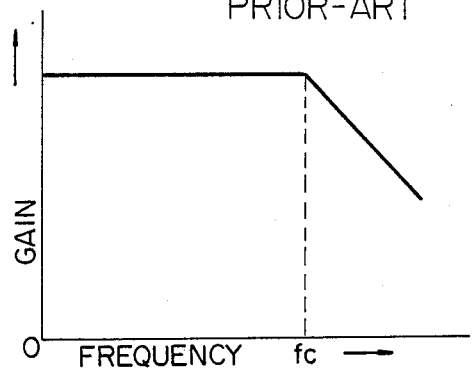
FIG. 3
PRIOR-ART

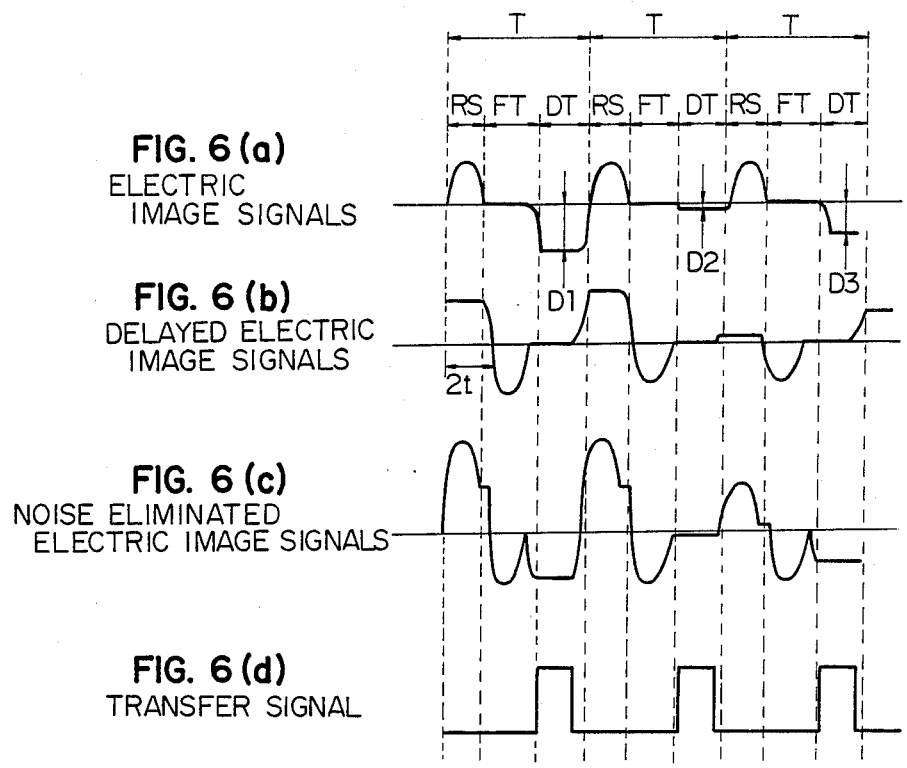
FIG. 6(a) ELECTRIC IMAGE SIGNALS
FIG. 6(b) DELAYED ELECTRIC IMAGE SIGNALS
FIG. 6(c) NOISE ELIMINATED ELECTRIC IMAGE SIGNALS
FIG. 6(d) TRANSFER SIGNAL
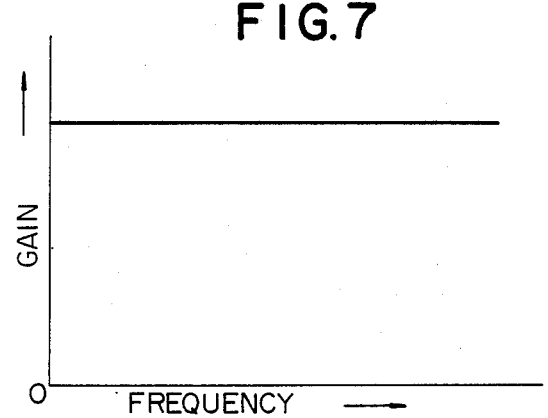
FIG. 7

IMAGE SIGNAL PROCESSOR WITH NOISE ELIMINATION CIRCUIT

FIELD OF THE INVENTION

This invention relates to an image processor and, more particularly, to a noise elimination circuit provided in association with a charge coupled device.

BACKGROUND OF THE INVENTION

A charge coupled device is well known as a converter operative to convert an optical image into a series of electric image signals. The charge coupled device is superior in size, weight, power consumption and reliability to the image camera tube and is capable of producing the electric image signals which are less liable to be influenced by an image distortion and by an image printing phenomenon. For these reasons, the charge coupled device is superseding the image camera tube in the field of the video tape recorder, camcorder as well as of the industrial camera. Moreover, since the charge coupled device is improved in the image resolution capability depending upon the development in the semiconductor manufacturing techniques, the charge coupled device is now used as an image sensor incorporated in the high resolution broadcasting camera.

The development in the semiconductor manufacturing techniques is conducive to a miniaturization the device size and to a high density integration, which results in a high resolution image sensor. However, the smaller the element in size, the less the amount of electric charges for each image signal. When the electric charges for the image signal are reduced, it is necessary to decrease the amount of electric charges due to noise for maintaining the sensitivity and the dynamic range. For this reason, research and development efforts are made for a noise elimination circuit capable of improving the signal-to-noise ratio for a high sensitivity image processor.

These efforts have resulted in various noise elimination techniques one of which is well known as a delay and differential noise elimination technique proposed by Nishida et al of NHK Science and Technical Research Laboratories. FIG. 1 shows the image processor provided with the noise elimination circuit using the delay and differential noise elimination technique. The image processor largely comprises a charge coupled device 1 and a noise elimination circuit 2. The charge coupled device 1 has a photoelectric transducing section 3, a driving circuit 4 coupled to the transfer port of the photo electric transducing section 3, and a buffer circuit coupled to the output node of the photo electric transducing section 3, and, on the other hand, the noise elimination circuit 2 has a differential amplifier circuit 6, a level adjusting resistor 7 with a relatively small in resistivity coupled between the inverted node of the differential amplifier 6 and the buffer circuit 5, a delay line 8 with a relatively large resistivity coupled between the non-inverted node of the differential amplifier 6 and the buffer circuit 5, a feedback resistor 9 coupled between the inverted node and the output node of the differential amplifier 6, a gate circuit 10 coupled at the input node thereof to the output node of the differential amplifier 6, and a pulse generating circuit 11 coupled to the control node of the gate circuit 10. The charge coupled device thus arranged produces a series of the electric image signals when an optical image falls upon the photo electric transducing section 3. With driving pulse signals supplied from the driving circuit 4, the photo electric transducing section 3 sequentially transfers the electric image signals from the photo electric transducing 3 to the buffer circuit 5 for a temporal storage, and the electric image signals are supplied in serial from the buffer circuit 5 to the noise elimination circuit 2 for improvement in the noise-to-signal ratio.

In detail, assuming now that a time frame T for each electric image signal (FIG. 2(a)) is divided into a resetting section RS, a feed through section FT, and a data section DT, the delay line 8 retards each electric image signal by a time interval TI to produce the delayed electric image signal as shown in FIG. 2(b). The intensities of small parts of the optical image are indicated by the differences D1, D2 and D3 in voltage level between the feed through sections FT and the data sections DT, respectively. When the electric image signals and the delayed electric image signals are supplied to the inverted node and the non-inverted node of the differential amplifier 6, the differential amplifier circuit 6 produces noise eliminated electric image signals each of which is modulated in amplitude on the basis of a difference due to the time interval TI. Then, the differences D1, D2 and D3 are reformed into the differences D1', D2' and D3' as seen from FIG. 2(c). The noise eliminated electric image signals are sampled with a transfer signal (FIG. 2(d)) fed from the pulse generating circuit 11 for extractions of the effective voltage levels, and the effective voltage levels are by way of example converted into time sequential image signals, respectively. By virtue of the time interval TI, each of the differences D1', D2' or D3' is produced as a difference voltage level between the feed through section FT of the delayed electric image signal and the data section DT of the original electric image signal, so that the differences D1', D2' and D3' are indicative of the actual intensities of the small parts of the optical image, respectively, even if noises ride on the electric image signals. Moreover, the effective voltage levels are extracted from the noise eliminated electric image signals by the gate circuit 10, the time sequential image signals are free from the folded noise components of the higher band inherent in the sample-and-hold circuit.

However, a problem is encountered in the prior-art noise elimination circuit in deterioration of the gain at a high frequency operation which is causative of a barrier for a higher resolution. This is because of the fact that a parasitic capacitance C is coupled to the inverted node of the differential amplifier 6. The parasitic capacitance is causative of a substantial amount of a time constant together with the feedback resistor 9 and, for this reason, allows the differential amplifier 6 to serve as an integrating circuit. The frequency response characteristics of the differential amplifier circuit 6 are shown in FIG. 3, and the cut-off frequency fc is calculated as follows $$fc = \tfrac{1}{2} \times \pi \times C \times Rf$$

where Rf is the resistance of the feedback resistor 9. If one of the parasitic capacitance C and the resistance Rf is increased in value, the responsible bandwidth is caused to be narrow with respect to the electric image signal supplied to the inverted input node, and, accordingly, the electric image signal is less liable to be balanced with the delayed electric image signal. For this reason, the noise elimination capability is deteriorated at a higher frequency over the cut-off frequency fc.

SUMMARY OF THE INVENTION

It is therefore an important object of the present invention to provide an image signal processor which is operable in a wide bandwidth without deterioration in the noise elimination capability.

To accomplish the object of the present invention, the present invention proposes to use a combination of a signal input amplifier circuit and a delay line coupled between the output node of the charge coupled device and the ground node.

In accordance with the present invention, there is provided an image signal processor for an optical image capable of being divided into a plurality of small parts, comprising: (a) a charge coupled device operative to produce a series of electric image signals each occupying a time frame and divided into a resetting section for discharging electric charges accumulated in the previous time frame, a feed through section for newly accumulating electric charges and a data section indicative of the intensity of each small part of the optical image, the feed through section having a voltage level approximately equal to a basic level; and (b) a noise eliminating circuit having (b-1) a delay line coupled at the input node thereof to an output node of the charge coupled device and at the output node thereof to a constant voltage node and operative to produce a series of delayed electric image signals inverted in waveform with respect to the basic level, a time interval between each electric image signal and each delayed electric image signal being selected in such a manner that the data section of each electric signal is merged into the feed through section of each delayed electric image signal for producing a noise eliminated electric image signal, (b-2) a single input amplifier circuit coupled between a source of voltage level and the constant voltage node and having an input node coupled to the input node of the delay line for amplifying the noise eliminated electric image signal, (b-3) a pulse generating circuit operative to produce a periodical transfer signal, and (b-4) gate means responsive to the periodical transfer signal and shifted between an on state and an off state for transferring a part of the data section of each noise eliminated electric image signal.

BRIEF DESCRIPTION OF THE DRAWINGS

The features and advantages of an image signal processor according to the present invention will be more clearly understood from the following description taken in conjunction with the accompanying drawings in which:

FIGS. 2(a)-(d) are charts showing the waveforms of essential signals produced in the prior-art image signal processor;

FIG. 3 is a graph showing the gain achieved by the differential amplifier incorporated in the prior-art image signal processor in terms of the frequency;

FIGS. 6(a)-(d) are charts showing the waveforms of essential signals produced in the image signal processor shown in FIG. 4; and FIG. 7 is a graph showing the gain achieved by the differential amplifier of the image signal processor shown in FIG. 4 in terms of the frequency.

DESCRIPTION OF THE PREFERRED EMBODIMENT

Figure 1:
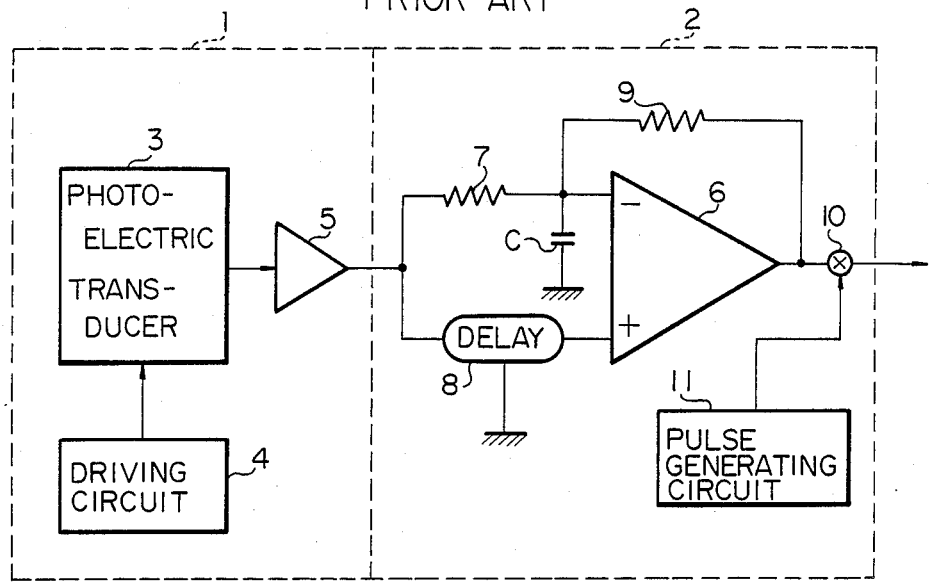
FIG. 1 is a block diagram showing the circuit arrangement of the image signal processor formed on the basis of the delay difference noise elimination technique.
Figure 4:
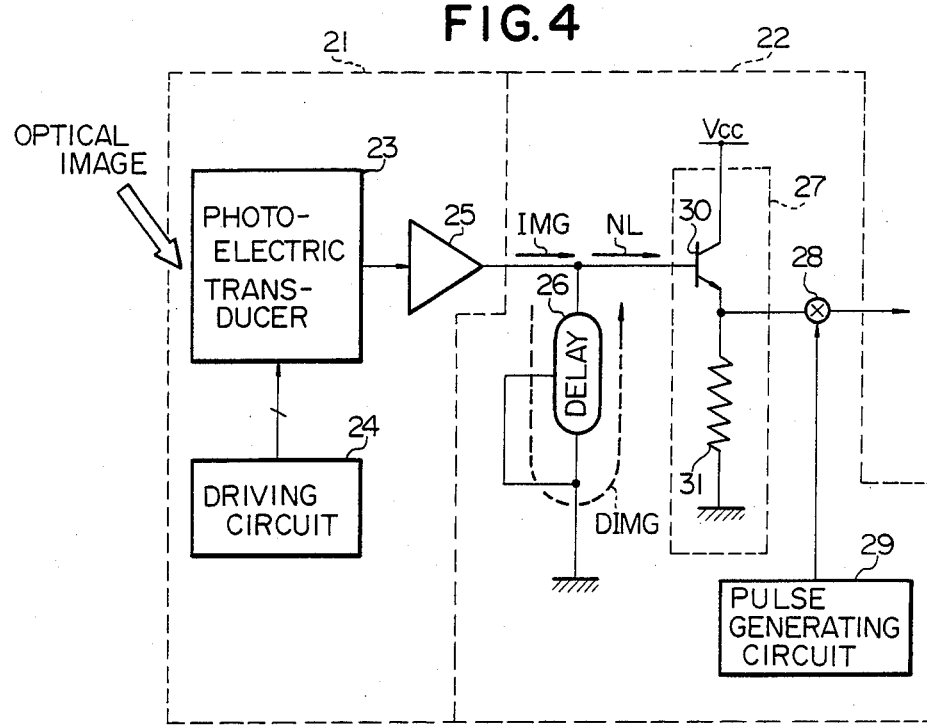
FIG. 4 is a block diagram showing the circuit arrangement of an image signal processor embodying the present invention.

Referring first to FIG. 4 of the drawings, there is shown the circuit arrangement of an image signal processor embodying the present invention. The image signal processor shown in FIG. 4 largely comprises a charge coupled device 21 for producing a series of electric image signals IMG and a noise eliminating circuit 22 for an elimination of noise components from the electric image signals IMG. The charge coupled device is of the multi-clocked type, however the multi-clocked charge coupled device may be replaced with another kind of the charge coupled device.

The charge coupled device has a photo electric transducing section 23 provided with a plurality of photo-electric transducing elements each capable of producing electric charges in the presence of an optical image. The amount of the electric charges produced by each photo-electric transducing element are varied by the intensity of a part of the optical image and converted into the electric image signal IMG. Though not shown in the drawings, the electric charges are supplied from each photo-electric transducing element to a shift register for charge transfer which in turn transfers the electric charges to a charge detector of, for example, the floating diffusion type. The charge detector is accompanied with an output amplifier ( not shown ) which produces the electric image signal IMG on the basis of the electric charges. The charge detector is further associated with a resetting circuit (not shown) which is operative to discharge the electric charges in the charge detector to a drain port, thereby allowing the electric image signal IMG to recover the voltage level thereof to a basis value. Each electric image signal IMG produced by the photo electric transducing section 23 thus arranged occupies a time frame T and is divided into three sections which consist of a resetting section, a feed through section and a data section. In the resetting section, the electric charges accumulated in the charge detector during the previous cycle are discharged to the drain port, and the electric charges produced in the current cycle are newly accumulated in the feed through section. Then, the resetting section allows the feed through section to recover to the basis voltage level, and the intensity of each part of the optical image is indicated by a difference D1, D2 or D3 in voltage level between the feed through section and the data section.

The photo electric transducing section 23 is accompanied with a driving circuit 24 which sequentially produces driving pulse signals different in phase from one another. With the driving pulse signals, the electric charges are transferred from the photo electric transducing section 23 to a buffer circuit 25, so that a series of the electric image signals IMG are adjusted in output impedance by the buffer circuit 25 and, then, supplied to the noise elimination circuit 22.

The noise elimination circuit 22 has a delay line 26 coupled to an output node of the charge coupled device 21, an emitter follower circuit 27 coupled between a source of voltage level Vcc and a ground node, and a gate circuit 28 provided in association with a pulse generating circuit 29. The emitter follower circuit 27 is formed by a series combination of an n-p-n type bipolar transistor 30 and a resistor 31, and the n-p-n type bipolar transistor 30 is coupled at the base node thereof to the delay line 26. The emitter follower circuit 30 thus arranged is supplied with a noise eliminated image signal NL from the delay line 26 and serves as a single input amplifier circuit, and the emitter node of the n-p-n type bipolar transistor 30 is coupled to the input node of the gate circuit 28. With a transfer signal fed from the pulse generating circuit 29, the gate circuit 28 is alternatively shifted between an on-state and an off state for establishing or blocking a conduction path formed therein.

Figure 5:
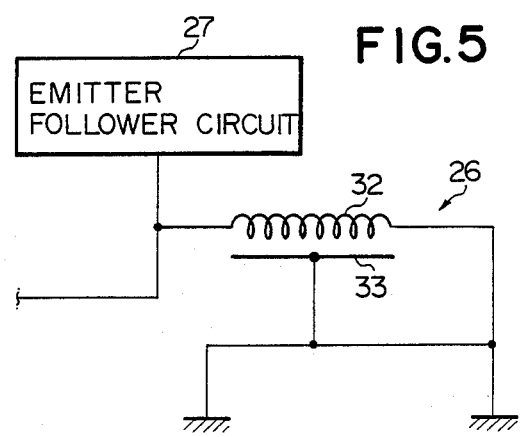
FIG. 5 is a circuit diagram showing the delay line incorporated in the image processor shown in FIG. 4.

Turning to FIG. 5 of the drawings, the delay line 26 is illustrated in detail and comprises an electro-magnetic delay line 32 associated with a ground line 33. Since the electromagnetic delay line 32 is terminated at the output node thereof to the ground node, the delay line 26 propagates the electric image signals IMG, and the electric image signals IMG are reflected from the ground node. While propagating from the input node to the output node or the ground node, the delay line 26 introduces a delay t in each of the electric image signals IMG, so that a delayed electric image signal DIMG with a total delay 2t is produced at the input node of the delay line 26. Each delayed electric image signal IMG is merged into the subsequent electric image signal to produce the noise eliminated electric image signal NL. In the case operated at 37.125 MHz, each time frame T of about 27 nano-seconds is divided into the resetting section RS of about 5 nano-seconds, the feed through section FT of about 10 nano-seconds, and the data section DT of about 12 nano-seconds.

Description will be hereinunder made for an operation of the image signal processor with reference to FIGS. 6(a)-(d) of the drawings. When an optical image falls upon the photo-transducing section 23, the plural photo-electric transducing elements convert small parts of the optical image into a series of the electric image signals IMG, respectively, and the electric image signals IMG are serially transferred from the photo electric transducing section 23 to the buffer circuit 25 for adjusting the impedance which in turn transfers the electric image signals IMG from the buffer circuit 25 to the delay line 26. The delay line 26 retards each of the electric image signals IMG by the time interval 2t to introduce the total delayed into each of the electric image signals which is merged into the subsequent electric image signal IMG. By virtue of the arrangement of the delay line 26, the delayed electric image signal DIMG is inverted in waveform with respect to the basis voltage level, and, for this reason, the noise components are eliminated from the electric image signal IMG after the mergence. The noise eliminated electric image signal NL thus produced is supplied to the base node of the n-p-n type bipolar transistor 30 for amplification and, then, supplied to the gate circuit 28. Since a negligible amount of the resistance and an extremely small amount of the parasitic capacitance are merely coupled to the base node of the n-p-n type bipolar transistor 30, the output buffer circuit 27 maintains a constant gain over a wide bandwidth as shown in FIG. 7. The gate circuit 28 is responsive to the transfer signal fed from the pulse generating circuit 29 and passes parts of the data sections DT each representative of the intensities of the parts of the optical image.

As will be understood from the foregoing description, the image signal processor according to the present invention is responsive to a series of the electric image signals increased in throughput, which results in the higher resolution capability of the image signal processor.

Although particular embodiments of the present invention have been shown and described, it will be obvious to those skilled in the art that various changes and modifications may be made without departing from the spirit and scope of the present invention.

What is claimed is:

1. An image signal processor for an optical image capable of being divided into a plurality of small parts, comprising:
   (a) a charge coupled device operative to produce a series of electric image signals each occupying a time frame and divided into a resetting section for discharging electric charges accumulated in the previous time frame, a feed through section for newly accumulating electric charges and a data section indicative of the intensity of each small part of said optical image, said feed through section having a voltage level approximately equal to a basic level; and
   (b) a noise eliminating circuit having
      (b-1) a delay line coupled at the input node thereof to an output node of said charge coupled device and at the output node thereof to a constant voltage node and operative to produce a series of delayed electric image signals inverted in waveform with respect to said basic level, a time interval between each electric image signal and each delayed electric image signal being selected in such a manner that the data section of each electric signal is merged into the feed through section of each delayed electric image signal for producing a noise eliminated electric image signal,
      (b-2) a single input amplifier circuit coupled between a source of voltage level and said constant voltage node and having an input node coupled to the input node of said delay line for amplifying said noise eliminated electric image signal,
      (b-3) a pulse generating circuit operative to produce a periodical transfer signal, and
      (b-4) gate means responsive to the periodical transfer signal and shifted between an on state and an off state for transferring a part of the data section of each noise eliminated electric image signal.

2. An image signal processor as set forth in claim 1, in which said constant voltage node has the ground voltage level.

3. An image signal processor as set forth in claim 2, in which the delay line has an electro-magnetic delay line in helical shape associated with a ground line.

4. An image signal processor as set forth in claim 3, in which said single input amplifier circuit is formed by an emitter follower circuit.

5. An image signal processor as set forth in claim 4, in which said emitter follower circuit has a series combination of a bipolar transistor and a resistor.

6. An image signal processor as set forth in claim 5, in which said charge coupled device comprises a driving circuit operative to produce driving pulse signals different in phase from one another, a buffer circuit operative to adjust an output impedance for said electric image signals, and a photo-electric transducing section operative to produce said electric image signals and responsive to the driving pulse signals for transferring the electric image signals to the buffer circuit.

* * * * *